United States Patent
Kitano et al.

(10) Patent No.: US 8,071,672 B2
(45) Date of Patent: Dec. 6, 2011

(54) LENS SHEET, PROCESS FOR PRODUCING THE SAME, AND RESIN COMPOSITION FOR TRANSFER MATERIAL

(75) Inventors: Takahiro Kitano, Tsukuba (JP); Masayasu Ogushi, Tainai (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 823 days.

(21) Appl. No.: 11/908,706

(22) PCT Filed: Mar. 14, 2006

(86) PCT No.: PCT/JP2006/305058
§ 371 (c)(1), (2), (4) Date: Nov. 27, 2007

(87) PCT Pub. No.: WO2006/098337
PCT Pub. Date: Sep. 21, 2006

(65) Prior Publication Data
US 2009/0052025 A1   Feb. 26, 2009

(30) Foreign Application Priority Data

Mar. 15, 2005 (JP) ................. 2005-073989
Jul. 28, 2005 (JP) ................. 2005-218947

(51) Int. Cl.
*C08K 3/04* (2006.01)
*G03B 21/60* (2006.01)

(52) U.S. Cl. ........................ 524/496; 359/456
(58) Field of Classification Search ............ 524/496
See application file for complete search history.

(56) References Cited

U.S. PATENT DOCUMENTS

| 5,286,521 | A | * | 2/1994 | Matsuda et al. | 427/146 |
| 5,342,731 | A | * | 8/1994 | Kelly et al. | 430/253 |
| 6,650,472 | B1 | | 11/2003 | Adachi et al. | |
| 7,435,531 | B2 | * | 10/2008 | Goto | 430/271.1 |

FOREIGN PATENT DOCUMENTS

| JP | 5 34829 | | 2/1993 |
| JP | 6 110132 | | 4/1994 |
| JP | 10 20403 | | 1/1998 |
| JP | 2003 162006 | | 6/2003 |
| JP | 2003162006 | A * | 6/2003 |
| JP | 2005 37693 | | 2/2005 |
| KR | 2004-70183 | A | 8/2004 |

OTHER PUBLICATIONS

Translation of JP2003162006, Jun. 2003.*

* cited by examiner

*Primary Examiner* — Ling Choi
*Assistant Examiner* — Hui Chin
(74) *Attorney, Agent, or Firm* — Oblon, Spivak, McClelland, Maier & Neustadt, L.L.P.

(57) ABSTRACT

To provide a lenticular lens sheet having a fine light shielding pattern that has high color reproducibility. [MEANS FOR SOLVING PROBLEMS] The above problem can be solved by a lenticular lens sheet, in which the average primary particle diameter of carbon black contained in a light shielding layer is not less than 10 nm and not more than 50 nm and, preferably, in an image of the cross-section of the light shielding layer under scanning electron microscopic observation, the area ratio of carbon black to the whole image is not less than 60% and not more than 95%, and a process for producing the lenticular lens sheet.

13 Claims, 1 Drawing Sheet

LENS SHEET, PROCESS FOR PRODUCING THE SAME, AND RESIN COMPOSITION FOR TRANSFER MATERIAL

TECHNICAL FIELD

The present invention relates to a lenticular lens sheet which is used as a rear projection display screen and a process for producing the same as well as a resin composition for a transfer material to be used in that process.

BACKGROUND ART

Lenticular sheets for use as rear projection screens are generally provided with a light shielding pattern for contrast improvement. In view of the recent better picture quality and higher definition requirements, however, the demand for rear projection screen display systems using liquid crystal displays or digital micromirror devices with smaller pixels has been growing. Therefore, lenticular lens sheets provided with a finer pitch light shielding pattern have become necessary so as to avoid moiré patterns resulting from interference of pixels with lenticular lenses.

In the art, as illustrated in Patent Document 1, for instance, a process has been employed which comprises providing a lenticular sheet, on the observing surface side thereof, with a photocurable adhesive resin layer, exposing the same from the lens surface side to cure light condensing parts alone and thereby eliminate the adhesive property of those parts, further scattering a toner from the observing surface side to allow the toner to stick only to those parts which retain their adhesive property and removing the residues other than the toner sticking to the adhesive parts.

However, when finer lens pitches are required for attaining better picture quality and higher definition, the process of Patent Document 1 has a problem in that a light shielding pattern with distinct dividing lines can hardly be obtained.

On the other hand, a printing process using a transfer sheet characterized in that a color layer comprising a color pigment, a high molecular weight polymer and, in addition to the color pigment, fine particles with an average primary particle diameter of not larger than 2 µm has been proposed as a process for forming a light shielding pattern with distinct dividing lines, as described in Patent Document 2, for instance. Although this process is a process appropriate for rendering the dividing lines distinct, the non-pigment fine particles contained in the color layer reduce the blackness of the light shielding pattern on the observing surface side and the color reproducibility tends to decrease upon projection in a light room.

Patent Document 1: Japanese Kokai Publication S59-121033 (scope of claim for patent, examples, etc.)
Patent Document 2: Japanese Kokai Publication 2003-162006 (scope of claim for patent, examples, etc.)
Patent Document 3: Japanese Kokai Publication 2004-246352 (scope of claim for patent, examples, etc.)

DISCLOSURE OF INVENTION

Problems to be Solved by the Invention

As described above, the prior art lenticular lens sheets have a problem in that the dividing lines are not distinct or the color reproducibility is unsatisfactory, and the real state of affairs is that lenticular lenses having a light shielding pattern having distinct dividing lines and high in color reproducibility are demanded in the market.

Accordingly, it is an object of the present invention to provide a lenticular lens sheet having a fine light shielding pattern that has high color reproducibility.

Means for Solving Problems

The present inventors found that a lenticular lens having a fine light shielding pattern and high in color reproducibility can be obtained when the values of $a^*$ and $b^*$ as found upon measurement of the color coordinates ($a^*,b^*$) according to JIS K 5600-4 are within certain respective ranges and that the values of $a^*$ and $b^*$ can be controlled by the particle diameter of carbon black contained in the light shielding layer and, as a result of further investigations, they have completed the present invention which can accomplish the above object.

Thus, the present invention relates to a lenticular lens sheet characterized in that the average primary particle diameter of carbon black contained in a light shielding layer is not less than 10 nm and not more than 50 nm.

In preferred aspects, the invention includes the lenticular lens sheet mentioned above in which the lens pitch in the lenticular lens is not more than 200 µm, the lenticular lens sheet mentioned above in which, in an image of the cross-section of the light shielding layer as obtained under scanning electron microscopic observation, the area ratio of carbon black to the whole image is not less than 60% and not more than 95%, and the lenticular lens sheet mentioned above which, upon measurement of color coordinates ($a^*,b^*$) from the observing surface side according to JIS K 5600-4, satisfy the relations (1) and (2) given below.

$$-2.0 \leq a^* \leq 2.0 \quad (1)$$

$$-2.0 \leq b^* \leq 1.0 \quad (2)$$

The invention further relates to a process for producing the above-defined lenticular lens sheet comprising the steps (1) to (3) specified below.

Step (1): The step of forming a photocurable resin layer on a flat face of a lenticular lens base sheet with a lens shape formed on one side with an opposite side being flat;

Step (2): The step of irradiating the photocurable resin layer with ultraviolet rays from the side of the lens shape formed to thereby cure those parts of the photocurable resin layer where light is condensed through the lenses;

Step (3): The step of bringing a transfer layer of a transfer material into close contact with the partially cured photocurable resin layer surface and allowing a color layer containing carbon black with a primary particle diameter not smaller than 10 nm and not larger than 50 nm to transfer only to the uncured parts to form a light shielding layer.

Further, the invention relates to a resin composition for transfer materials and a transfer material comprising the composition, and the resin composition is characterized in that it comprises the components (a) to (c):

Component (a): a pigment,
Component (b): a hydroxyl group-containing polymer,
Component (c): an acidic group- or basic group-containing polymer or a salt thereof, wherein the mass proportion of the component (a) is not lower than 60% by mass and not higher than 90% by mass with the sum of the components (a) to (c) being taken as 100%.

The invention further relates to a resin composition as specified above wherein the component (a) pigment is carbon black with a particle diameter not smaller than 10 nm and not larger than 50 nm.

The invention relates to a process for producing the above lenticular lens sheet wherein the transfer material includes a transfer layer made of the resin composition for transfer materials according to Claim 7.

Effects of the Invention

The lenticular lens sheet of the invention is a high definition lenticular lens sheet having good color reproducibility and can advantageously be used as a rear projection screen. The process according to the invention can give a high definition lenticular lens sheet having good color reproducibility and, further, by use of the transfer material according to the invention, it becomes possible to efficiently utilize the process for producing a high definition lenticular lens sheet having good color reproducibility.

BEST MODES FOR CARRYING OUT THE INVENTION

Figure 1:
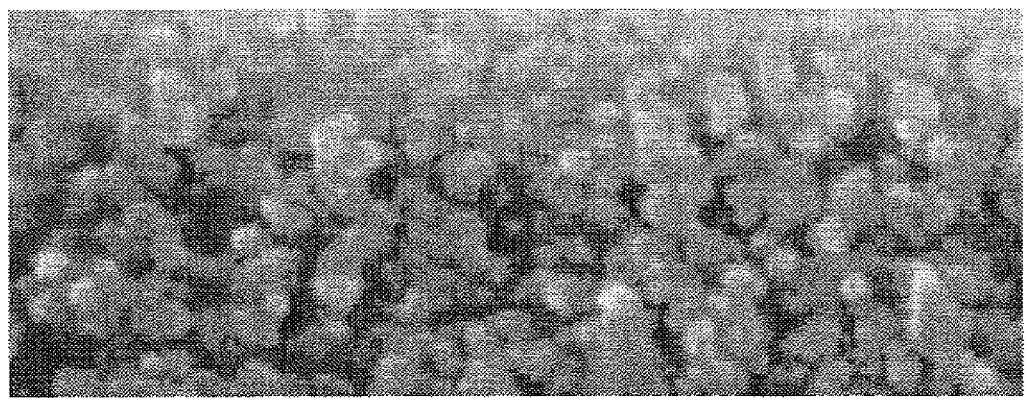
[FIG. 1] A scanning electron photomicrograph of carbon black.

In the following, the invention is described in detail.

The lenticular lens sheet of the invention comprises lenses formed on one side and a light shielding layer formed on the flat surface which is the opposite flat side of the lenticular lens sheet.

From the moiré pattern prevention viewpoint, the lenticular lens sheet to be used in the practice of the invention preferably has a lens pitch of not higher than 200 μm. The lens array may be a one-dimensional one, namely an array of cylindrical lenses, or a two-dimensional one, namely an array of convex lenses. Further, it may have a constitution resulting from lamination of two lens layers, as proposed in Patent Document 3.

The method of producing the lenticular lens sheet is not particularly restricted but any of the methods known in the art may be employed. For example, mention may be made of the method comprising processing a thermoplastic resin such as poly(methyl metharylate), polystyrene, a polycarbonate or a methyl methacrylate-styrene copolymer by extrusion molding or injection molding, and the method comprising applying a photocurable resin or a thermoplastic resin onto a substrate made of poly(ethylene terephthalate) or the like and then irradiating the coat layer with light rays for curing while molding using a mold. The photocurable resin or thermoplastic resin is not particularly restricted and may be any of those known in the art. As specific examples of the photocurable resin, there may be mentioned acrylic acid esters supplemented with a photoradical generator, epoxy esters or oxetane esters supplemented with a photoacid generator, and the like. As specific examples of the thermosetting resin, there may be mentioned epoxy resins, melamine resins, urethane resins and the like.

Now, the light shielding layer to be formed on the flat surface of the lenticular lens sheet in the practice of the invention is described. The light shielding layer is a layer for preventing the occurrence of the phenomenon of double image as resulting from diffuse reflection of the light incident from the lens side and from the reflected light leaking out on the observing surface side and for inhibiting the reflection of the external light incident on other parts than parts for light emission.

It is important that the average primary particle diameter of carbon black contained in the light shielding layer be not less than 10 nm and not more than 50 nm, preferably not less than 10 nm and not more than 30 nm. When the average primary particle diameter is less than 10 nm, particles aggregate to an increased extent and unfavorably become less dispersible. On the other hand, when the average primary particle diameter is in excess of 50 nm, the particles assume a reddish black color and, when observed from the observing surface side, the lenticular lens sheet presents a reddish appearance, leading to decreases in color reproducibility.

The carbon black species to be incorporated in the light shielding layer to be formed on the lenticular lens sheet of the invention is not particularly restricted and may be any one that has an average primary particle diameter of not smaller than 10 nm and not larger than 50 nm. From the dispersibility viewpoint, however, the nitrogen adsorption-based specific surface area, which is generally used as a physical property index of carbon black, is preferably not smaller than 50 $m^2/g$ and not larger than 500 $m^2/g$, more preferably not smaller than 200 $m^2/g$ and not larger than 400 $m^2/g$. From the dispersibility and color reproducibility viewpoint, the pH value of carbon black is preferably not lower than 2.5 and not higher than 8.0, more preferably not lower than 2.5 and not higher than 7.0.

As the method of measuring the average primary particle diameter of carbon black contained in the light shielding layer, there may be mentioned the method comprising observing a cross section of the light shielding layer and measuring particle diameters. More specifically, the method comprises subjecting the light shielding layer cross section to electron microscopic observation, measuring carbon black particle diameters on the image obtained and calculating the average primary particle diameter taking the magnification of the image into consideration. As regards the number of particles to be measured, either all carbon particles appearing in the image or a certain number of particles selected at random may be used. In the case of random selection, it is necessary that at least 30 or more carbon particles be measured. For high precision measurement, an electron microscopic observation image with a magnification of at least $5\times10^4$ is preferably used for particle diameter determination.

The method of measuring carbon black particle diameters on an image may comprise direct measurements using a ruler or the like or may comprise making calculations using electronic data from the image and a program capable of calculating particle diameters from the image. Attention should be paid to the fact that the particles to be measured in the practice of the invention are primary particles; even when primary carbon black particles are in the form of aggregates as a result of aggregation thereof as found as a result of electronic microscopic observation, for instance, it is necessary to measure the diameters of individual carbon black particles forming the aggregates, not the sizes of the aggregates.

The composition of the components constituting the light shielding layer in the practice of the invention is not particularly restricted provided that the average primary particle diameter of carbon black is not less than 10 nm and not more than 50 nm. Basically, it is a composition comprising carbon black and a polymer.

The polymer mentioned above is a component necessary for improving the dispersibility of carbon black and maintaining the strength of the layer as a film. The polymer is not particularly restricted and may be any of those known in the art, including, for example, polyester resins, butyral resins, acrylic resins, amino resins, epoxy resins, polyurethane resins, vinyl chloride resins, fluororesins, silicone resins, phenol resins and cellulosic resins. Polar group- or polar group salt moiety-containing resins belonging to such categories of resins as mentioned above are preferred among others. Specific examples of the polar group are hydroxyl, carboxyl, sulfonyl, acid amide and amino groups, and specific examples of the polar group salt moiety are sulfonic acid sodium salt and acid amide amine salt moieties. While these resins may be used singly, two or more species may also be used in admixture. For example, polyester acid amide amine salts are preferred for improving the dispersibility of carbon black and, on the other hand, butyral resins are preferred for maintaining the strength as a film; therefore, it is also possible to use mixtures of these two kinds of resins.

It is also possible for the light shielding layer to contain, in addition to the composition mentioned above, a leveling agent, an inorganic filler and/or the like each in an amount that will not lessen the effects of the invention. It is a matter of course that the layer may also contain carbon black particles smaller than 10 nm or larger than 50 nm in a manner such that the average primary particle diameter may satisfy the range requirement from not less than 10 nm to not more than 50 nm.

The lenticular lens sheet of the invention is characterized in that it is a lenticular lens sheet according to Claim 1 or 2, wherein, in an image of an cross section of the light shielding layer as obtained by scanning electron microscopic observation, the area proportion of carbon black to the whole image is not less than 60% and not more than 95%. When the volume proportion of carbon black contained in the light shielding layer is excessively high, the light shielding layer may become fragile and, when that proportion is excessively low, the light shielding performance may possibly be low. As the method of measuring the volume proportion of carbon black contained in the light shielding layer, there may be mentioned the method which comprises observing a cross section of the light shielding layer. More specifically, mention may be made of the method comprising observing a cross section of the light shielding layer under a scanning electron microscope and measuring, in an image covering a certain range as thus obtained, the area occupied by carbon black relative to the whole image. Available as the method of measuring the area based on an image are the method comprising printing the image on a sheet of paper uniform in weight per area, cutting the paper to divide into the carbon black-based printed portions and other portions and calculating the area ratio based on the weights thereof, and the method comprising using electronic data concerning the image for treatment to convert the image to a binary image, namely a black and white image, by rendering the carbon black portions alone black, and making a calculation from the area ratio between the white portions and the black portions. The program for such calculation or processing includes, but is not limited to, the software called "imageJ" (United States National Institute of Mental Health/Neurological Disorders and Stroke, Research Support Branch HP http://rsb.info.nih.gov/ij/index.html) etc.

Figure 2:
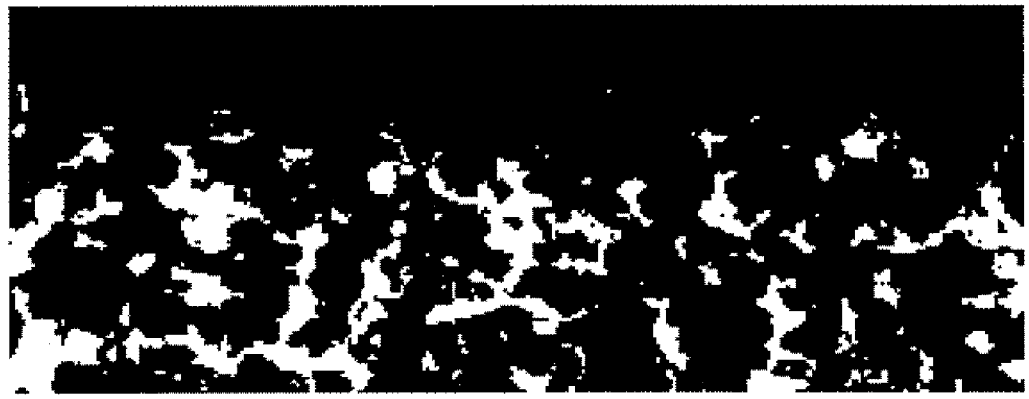
[FIG. 2] A result of treatment for conversion of the photograph shown in FIG. 1 to a binary image.

Here, in the case of carrying out the treatment for conversion of the image to a white and black binary image using electronic data for the image, the area proportion of carbon black may vary depending on the criterion for determining the boundary between a carbon black portion and the other portion. The criterion to be used in conversion to a binary image in the practice of the invention is described below. The photograph shown in FIG. 1 is an image observed under a scanning electron microscope, and the photograph shown in FIG. 2 is a binary image derived from the photograph of FIG. 1. Here, the black portions are the portions occupied by carbon black. The processing conditions for the treatment for conversion to a binary image are to be determined so that results equivalent to the results mentioned above may be obtained.

In the practice of the invention, the volume proportion of carbon black primary particles with a diameter not smaller than 10 nm and not larger than 50 nm as contained in the light shielding layer is preferably not lower than 60% and not higher than 95%, more preferably not lower than 70% and not higher than 90%, when determined as the ratio of the area occupied by carbon black to the whole image within a certain range.

As the light shielding layer thickness decreases, the light shielding performance decreases and, as the thickness increases, the aspect ratio between the width direction and the height direction increases and the layer becomes easier to be destroyed. Therefore, the light shielding layer thickness is preferably not less than 0.5 µm and not more than 10 µm, more preferably not less than 1 µm and not more than 5 µm.

Further, the lenticular lens sheet of the invention is a lenticular lens sheet according to any of Claims 1 to 3, wherein the color coordinates ($a^*, b^*$) measured according to JIS K 5600-4 from the observing surface side satisfy the relations (1) and (2) given below.

$$-2.0 \leq a^* \leq 2.0 \quad (1)$$

$$-2.0 \leq b^* \leq 1.0 \quad (2)$$

The color coordinates to be measured according to JIS K 5600-4 are explained in the following (excerpt from JIS K 5600-4-4).

The characteristic of a color is uniquely represented by a point indicated by three vectors at right angles to one another in a three-dimensional coordinate system for a defined observer and a defined light source. In JIS K 5600-4, it is prescribed that from among various color coordinate systems recommended by the CIE (Commission Internationale de l'Eclairage), the color coordinates of the supplementary standard color model (CIE 1964) (cf. CIE Publication No. 15) and the color coordinates of the $L^*a^*b^*$ color space (CIE 1976) (cf. CIE Publication No. 15, Supplement No. 2) be used for colorimetry of coat films. In the practice of the invention, the color coordinates of the $L^*a^*b^*$ color space (CIE 1976) are used. These color coordinates are calculated by the following equations.

$$L^* = 116(Y/Yn)^{1/3} - 16 \text{ when } Y/Yn > 0.008856 \quad (i)$$

$$L^* = 903.3(Y/Yn) \text{ when } Y/Yn \leq 0.008856 \quad (ii)$$

$$a^* = 500[f(X/Xn) - f(Y/Yn)] \quad (iii)$$

$$b^* = 200[f(Y/Yn) - f(Z/Zn)] \quad (iv)$$

In the above equations, $$f(X/Xn) = (X/Xn)^{1/3} \text{ when } X/Xn > 0.008856$$

$$f(X/Xn) = 7.787(X/Xn) + 16/116 \text{ when } X/Xn \leq 0.008856$$

$$f(Y/Yn) = (Y/Yn)^{1/3} \text{ when } Y/Yn > 0.008856$$

$$f(Y/Yn) = 7.787(Y/Yn) + 16/116 \text{ when } Y/Yn \leq 0.008856$$

$$f(Z/Zn) = (Z/Zn)^{1/3} \text{ when } Z/Zn > 0.008856$$

$$f(Z/Zn) = 7.787(Z/Zn) + 16/116 \text{ when } Z/Zn \leq 0.008856.$$

X, Y and Z represent the 10-degree tristimulus values for a coat film. Xn, Yn and Zn are the 10-degree tristimulus values for a perfect reflecting diffuser under a selected standard light.

In the practice of the invention, when the value of a* is smaller than −2.0, the color is close to green and, when it is greater than 2.0, the color is close to red and, in either case, the color reproducibility tends to decrease. When the value of a* is smaller than −2.0, the color is close to blue and, when it is greater than 1.0, the color is close to yellow and, in either case, the color reproducibility tends to decrease.

Therefore, it is preferred that the color coordinates (a*,b*) measured from the observing surface side according to JIS K 5600-4 satisfy the following relations (1) and (2):

$$-2.0 \leq a^* \leq 2.0 \quad (1)$$

$$-2.0 \leq b^* \leq 1.0 \quad (2).$$

More preferably, they satisfy the following relations (3) and (4):

$$-1.0 \leq a^* \leq 1.0 \quad (3)$$

$$-2.0 \leq b^* \leq 1.0 \quad (4).$$

The resin composition of the invention is a resin composition for forming the color layer contained in the transfer layer of the transfer material to be used in producing a lenticular lens sheet provided with a light shielding pattern and is a resin composition comprising the following components (a) to (c):
Component (a): a pigment,
Component (b): a hydroxyl group-containing polymer,
Component (c): an acidic group- or basic group-containing polymer or a salt thereof,
wherein the mass proportion of the component (a), namely pigment, is not lower than 60% by mass and not higher than 90% by mass with the sum of the components (a)-(c) being taken as 100%.

The component (a), namely pigment, is a component for providing the light shielding layer with light shielding properties. It is not particularly restricted and may be any of those pigments which are known in the art, including, for example, white pigments such as zinc white, white lead, titanium white, basic lead sulfate and antimony oxide, black pigments such as carbon black, lamp black, acetylene black, ivory black, bone black and graphite, red pigments such as cadmium red, antimony vermillion and red lakes, yellow pigments such as chrome yellow, zinc yellow, cadmium yellow, yellow iron oxide and yellow lakes, blue pigments such as Prussian blue, ultramarine, cobalt blue and phthalocyanine pigments, green pigments such as chrome green, chromium oxide, emerald green, zinc green and Guignet's green, brown pigments such as iron oxide, iron oxide red and ocher, metal pigments such as aluminum powder, bronze powder, zinc dust and lead powder, and extender pigments such as calcium carbonate powder, calcium carbonate, barium sulfate, alumina, clays and magnesium carbonate. Since, however, the light shielding layer of a lenticular lens sheet provided with a light shielding pattern is generally desired to be black, black pigments are preferred. From the ready availability and appearance quality viewpoint, carbon black species are more preferred. Among them, those carbon black species which are not less than 10 nm and not more than 50 nm in particle diameter are still more preferred.

At low levels of addition of the component (a) pigment, the light shielding effect is low and therefore the color reproducibility is poor and, at excessively high addition levels, the film strength becomes low and the coat film becomes fragile. Therefore, it is even more preferred that the mass proportion thereof relative to the resin composition be not lower than 60% by mass and not higher than 90% by mass, more preferably not lower than 70% by mass and not higher than 85% by mass.

When carbon black is to be used as the component (a) pigment, such species thereof as mentioned above can suitably be used.

The carbon black species to be used as the component (a) pigment is not particularly restricted but, from the dispersibility viewpoint, the nitrogen adsorption-based specific surface area, which is generally used as a physical property index of carbon black, thereof is preferably not smaller than 50 m$^2$/g and not larger than 500 m$^2$/g, more preferably not smaller than 200 m$^2$/g and not larger than 400 m$^2$/g. From the dispersibility and color reproducibility viewpoint, the carbon black species preferably has a pH value of not lower than 2.5 and not higher than 8.0, more preferably not lower than 2.5 and not higher than 7.0.

As the method of measuring the average primary particle diameter of the carbon black used as the component (a) pigment, there may be mentioned the method comprising observing a cross section of the light shielding layer and measuring particle diameters. More specifically, the method comprises subjecting the light shielding layer cross section to electron microscopic observation, measuring carbon black particle diameters on the image obtained and calculating the average primary particle diameter taking the magnification of the image into consideration. As regards the number of particles to be measured, either all carbon particles appearing in the image or a certain number of particles selected at random may be used. In the case of random selection, it is necessary that at least 30 or more carbon particles be measured. For high precision measurement, an electron microscopic observation image with a magnification of $5 \times 10^4$ or higher is preferably used for particle diameter determination.

The method of measuring carbon black particle diameters on an image may comprise direct measurements using a ruler or the like or may comprise making calculations using electronic data from the image and a program capable of calculating particle diameters from the image. Attention should be paid to the fact that the particles to be measured in the practice of the invention are primary particles; even when primary carbon black particles are in the form of aggregates as a result of aggregation thereof as found as a result of electronic microscopic observation, for instance, it is necessary to measure the diameters of individual carbon black particles forming the aggregates, not the sizes of the aggregates.

The component (b), which is a hydroxyl group-containing polymer, is a component necessary for securing the film strength of the light shielding layer. It is not particularly restricted and may be any of the hydroxyl group-containing polymers known in the art, including, for example, polyester resins, poly(vinyl alcohol) resins, butyral resins, acrylic resins, amino resins, epoxy resins, polyurethane resins, vinyl chloride resins, fluororesins, silicone resins, phenol resins and cellulosic resins. From the transferability and pigment dispersion stability viewpoint, butyral resins, acrylic resins and polyester resins are preferred, and butyral resins are more preferred.

The mass proportion of the component (b) hydroxyl group-containing polymer is preferably not lower than 5% by mass and not higher than 40% by mass, more preferably not lower than 10% by mass and not higher than 20% by mass, with the sum of the components (a) to (c) being taken as 100%.

The component (c), which is an acidic group- or basic group-containing polymer or a salt thereof, is a component necessary for improving the dispersibility of the pigment. It is not particularly restricted and may be any of those acidic group- or basic group-containing polymers and salts thereof which are known in the art, including acrylic resins and saturated and unsaturated polyester resins, among others. As the acidic group, there may be mentioned carboxyl and sulfonic acid groups and, as the acidic acid-derived salt, there may be mentioned the lithium salt, sodium salt and potassium salt, among others. As examples of the basic group, there may be mentioned amino, imido and acid amide groups and, as the basic group-derived salt, there may be mentioned quaternary ammonium chloride salts and acid amide amine salts, among others. Depending on the pigment species employed, basic group-containing and basic group-derived salt moiety-containing polymers are preferably used in combination with acidic pigments while acidic group-containing and acidic group-derived salt moiety-containing polymers are preferably used in combination with basic pigments.

The mass proportion of the component (c), namely the acidic group- or basic group-containing polymer or a salt thereof, is preferably not lower than 5% by mass and not higher than 40% by mass, more preferably not lower than 10% by mass and not higher than 20% by mass, with the sum of the components (a) to (c) being taken as 100%.

In the resin composition of the invention, use may be made of a diluent according to the intended purpose. The diluent is not particularly restricted and may be any of those diluents generally used in resin paints, including ketone compounds such as acetone, methyl ethyl ketone and cyclohexanone; ester compounds such as methyl acetate, ethyl acetate, butyl acetate, ethyl lactate and methoxyethyl acetate; ether compounds such as diethyl ether, ethylene glycol dimethyl ether, ethyl cellosolve, butyl cellosolve, phenyl cellosolve and dioxane; aromatic compounds such as toluene and xylene; aliphatic compounds such as pentane and hexane; halogenated hydrocarbons such as methylene chloride, chlorobenzene and chloroform; alcohol compounds such as methanol, ethanol, normalpropanol and isopropanol; and water, among others.

It is also possible for the resin composition to contain a leveling agent, an inorganic filler and/or the like, each at an addition level at which the effects of the invention will not be lessened. If necessary, a diluent may be added to the composition for application thereof in the manner of coating.

The resin composition of the invention can be mixed up by a mixing method known in the art. Specifically, mention may be made of such means as propeller stirring, the use of roll mills, ball mills or bead mills, or ultrasonication, and appropriate means can be selected from among these. Preferred among them from the practicality and dispersibility viewpoint are ball mills and bead mills.

Further, the present invention provides a transfer material for use in the process for producing the lenticular lens sheet. The transfer material according to the invention is a laminate composed of a base film and a transfer layer comprising at least a light shielding layer comprising the resin composition according to Claim 1 or 2, and the transfer layer may further comprise a binder layer and/or a protective layer, for instance. Thus, the constitution of the transfer layer includes such constitutions as light shielding layer alone, protective layer/light shielding layer and light shielding layer/binder layer and can be selected according to the intended use. The base film to be used in the transfer material according to the invention is not particularly restricted and may be a sufficiently self-supporting film generally used in transfer foils.

As specific examples of the base film, there may be mentioned, among others, synthetic resin films such as poly(ethylene terephthalate) films, polypropylene films, polycarbonate films, polystyrene films, polyamide films, polyamideimide films, polyethylene films, poly(vinyl chloride) films and fluororesin films; artificial resin films such as cellulose acetate films; machine-made papers such as cellophane papers and glassine papers; other film-shaped materials such as Japanese papers; and composite film-shaped materials and composite sheet materials made of these.

The thickness of the base film is not particularly restricted but, for preventing the occurrence of creasing and cracking, it is generally preferred that the thickness be within the range of 4 to 150 μm, more preferably within the range of 12 to 100 μm, still more preferably within the range of 25 to 50 μm.

In cases where the mold release characteristics of the base film are insufficient, at least one side of the base film can be subjected to mold releasing treatment. Such mold releasing treatment can be carried out in the conventional manner using a properly selected mold releasing polymer or wax. As the treatment agent to be used in such mold releasing treatment, there may be mentioned, for example, mold releasing waxes such as paraffin waxes; mold releasing resins such as silicone resins, melamine resins, urea resins, urea-melamine resins, cellulosic resins and benzoguanamine resins; and various surfactants. A mold releasing base film can be formed by mixing one or a combination of two or more of such agents with a solvent or the like and applying the mixture onto a base film according to an ordinary method of printing, such as gravure printing, screen printing or offset printing, followed by drying, and if necessary, further followed by curing (by such curing means as drying, ultraviolet irradiation, electron beam irradiation or other irradiation).

A transfer layer comprising a light shielding layer comprising the resin composition according to the invention can be formed on the base film by such a technique as immersion, coating using a roll used in letter press printing, planography or intaglio printing, for instance, spraying such as spraying onto the base material, or curtain flow coating.

The thickness of the light shielding layer comprising the resin composition according to the invention according to Claim 1 or 2 is preferably not less than 0.1 μm and not more than 10 μm, more preferably not less than 1 μm and not more than 5 μm.

Now, the method of forming a light shielding layer on a lenticular lens sheet is described.

The method of forming a light shielding layer on the lenticular lens sheet of the invention is not particularly restricted and may be any of the methods by which a light shielding layer having the above-mentioned constitution can be formed. From the color reproducibility viewpoint, a process for producing a lenticular lens sheet provided with a light shielding pattern as comprising the steps (1) to (3) mentioned below is preferably employed.

Step (1): The step of forming a photocurable resin layer on a flat face of a lenticular lens base sheet with a lens shape formed on one side with an opposite side being flat;
Step (2): The step of irradiating the photocurable resin layer with ultraviolet rays from the side of the lens shape formed to thereby cure those parts of the photocurable resin layer where light is condensed through the lenses;
Step (3): The step of bringing a transfer material into close contact with the partially cured photocurable resin layer surface and allowing a color layer containing carbon black with a primary particle diameter not smaller than 10 nm and not larger than 50 nm to transfer only to the uncured parts to form a light shielding layer.

In the following, the process for producing a lenticular lens sheet provided with a light shielding pattern which comprises the steps (1) to (3) is described specifically.

The step (1) is a step of forming a photocurable resin layer on a flat face of a lenticular lens base sheet with a lens shape formed on one side with an opposite side being flat, and the photocurable resin layer can be formed by such a technique as immersion, coating using a roll used in letter press printing, planography or intaglio printing, for instance, spraying such as spraying onto the base material, or curtain flow coating. Further, the method which comprises using a transfer material may also be utilized as a method of forming a photocurable resin layer on the base material.

The curable resin composition to be used on the occasion of forming a photocurable resin layer may be supplemented with a diluent prior to coating. On that occasion, the diluent can be used at an arbitrary addition level adapted for the intended thickness of the layer made of the curable resin composition. Such diluent is not particularly restricted and may be any of those diluents commonly used in resin paints, including ketone compounds such as acetone, methyl ethyl ketone, methyl isobutyl ketone and cyclohexanone; ester compounds such as methyl acetate, ethyl acetate, butyl acetate, ethyl lactate and methoxyethyl acetate; ether compounds such as diethyl ether, ethylene glycol dimethyl ether, ethyl cellosolve, butyl cellosolve, phenyl cellosolve and dioxane; aromatic compounds such as toluene and xylene; aliphatic compounds such as pentane and hexane; halogenated hydrocarbons such as methylene chloride, chlorobenzene and chloroform; alcohol compounds such as methanol, ethanol, normalpropanol and isopropanol; and water, among others. An appropriate diluent can be employed according to the sheet material resin used.

The lenticular lens base sheet with a lens shape formed on one side with the opposite side being flat is not particularly restricted and may be any of the lenticular lens sheets known in the art which have a lens shape formed on one side with the opposite side being flat, and the lens shape may be a one-dimensional one, namely an array of cylindrical lenses, or a two-dimensional one, namely an array of convex lenses. Further, it may have a constitution resulting from lamination of two lens layers, as proposed in Patent Document 3.

The step (2) is a step of irradiating the laminate obtained in the above step (1) and composed of the lenticular lens sheet and photocurable resin layer with ultraviolet rays from the side of the lens shape formed thereon to thereby cure those parts of the photocurable resin layer where light is condensed through the lenses. It is a step of curing those parts where the adhesion of the light shielding layer is unwanted. As specific sources of ultraviolet rays, there may be mentioned low pressure mercury lamps, high pressure mercury lamps, xenon lamps and metal halide lamps, among others. The mode of ultraviolet irradiation may be batchwise or continuous. It is preferred, however, that the laminate be irradiated with ultraviolet rays in the direction perpendicular to the lens surface. Although diffused ultraviolet light may also be used as ultraviolet rays, parallel ultraviolet rays are more preferred. The method of irradiation with such parallel rays is not particularly restricted and may be any of the methods known in the art, for example the method of irradiation through a Fresnel lens or the method of irradiation through a slit or slits.

The step (3) is a step of bringing a transfer material into close contact with the photocurable resin layer surface of the laminate composed of the lenticular lens base sheet and partially cured photocurable resin layer as obtained in the step (2) and allowing a color layer containing carbon black with a primary particle diameter not smaller than 10 nm and not larger than 50 nm to transfer only to the uncured parts to form a light shielding layer.

The method of bringing the color layer surface of the transfer material into close contact is not particularly restricted and may be any of the methods known in the art, for example the method comprising using a roll for application under pressure. When a roll is used for application under pressure, the roll may be at room temperature, namely about 25° C., or the method comprising heating the roll at about 30 to 80° C. can also be used.

Now, the transfer material having a color layer comprising a carbon black species having a primary particle diameter of not smaller than 10 nm and not larger than 50 nm, which constitutes an aspect of the present invention, is described. This transfer material can be used as the transfer material in the step (3) in the process for producing a lenticular lens sheet provided with a light shielding pattern which process comprises the steps (1) to (3) mentioned above.

The transfer material according to the invention is a laminate composed of a base film and a transfer layer comprising at least a color layer as disposed on that film, and the transfer layer may further comprise a binder layer, a protective layer and/or the like. As the constitution of the transfer layer, there may be mentioned such constitutions as color layer alone, protective layer/color layer and color layer/binder layer, and an appropriate one can be selected according to the intended use. The base film to be used in the transfer material according to the invention is not particularly restricted and may be a sufficiently self-supporting film generally used in transfer foils.

As specific examples of the base film, there may be mentioned, among others, synthetic resin films such as poly(ethylene terephthalate) films, polypropylene films, polycarbonate films, polystyrene films, polyamide films, polyamideimide films, polyethylene films, poly(vinyl chloride) films and fluororesin films; artificial resin films such as cellulose acetate films; machine-made papers such as cellophane papers and glassine papers; other film-shaped materials such as Japanese papers; and composite film-shaped materials and composite sheet materials derived from these.

The thickness of the base film is not particularly restricted but, for preventing the occurrence of creasing and cracking, it is generally preferred that the thickness be within the range of 4 to 150 μm, more preferably within the range of 12 to 100 μm, still more preferably within the range of 25 to 50 μm.

In cases where the mold release characteristics of the base film are insufficient, at least one side of the base film can be subjected to mold releasing treatment. Such mold releasing treatment can be carried out in the conventional manner using a properly selected mold releasing polymer or wax. As the treatment agent to be used in such mold releasing treatment, there may be mentioned, for example, mold releasing waxes such as paraffin waxes; mold releasing resins such as silicone resins, melamine resins, urea resins, urea-melamine resins, cellulosic resins and benzoguanamine resins; and various surfactants. A mold releasing base film can be formed by mixing one or a combination of two or more of such agents with a solvent or the like and applying the mixture onto a base film according to an ordinary method of printing, such as gravure printing, screen printing or offset printing, followed by drying, and if necessary, further followed by curing (by such curing means as drying, ultraviolet irradiation, electron beam irradiation or other irradiation).

The color layer can be formed on the base film by such a technique as immersion, coating using a roll used in letter press printing, planography or intaglio printing, for instance, spraying such as spraying onto the base material, or curtain flow coating.

The color layer contained in the transfer material according to the invention is now described.

It is necessary that the primary particle diameter of carbon black contained in the color layer included in the transfer material according to the invention be not less than 10 nm and not more than 50 nm. When the average primary particle diameter is less than 10 nm, particles aggregate to an increased extent and unfavorably become less dispersible. On the other hand, when the average primary particle diameter is in excess of 50 nm, the particles assume a reddish black color and, when observed from the observing surface side, the lenticular lens sheet presents a reddish appearance, unfavorably leading to decreases in color reproducibility.

As the color layer thickness decreases, the light shielding performance decreases and, as the thickness increases, the aspect ratio between the width direction and the height direction increases and the layer becomes destroyable more easily. Therefore, the color layer thickness is preferably not less than 0.5 μm and not more than 10 μm, more preferably not less than 1 μm and not more than 5 μm.

The composition of the color layer is not particularly restricted provided that the average primary particle diameter of carbon black is not less than 10 nm and not more than 50 nm. Basically, it is a composition comprising carbon black and a polymer. The polymer is a component necessary for improving the dispersibility of carbon black and maintaining the strength of the layer as a film. The polymer is not particularly restricted and may be any of those known in the art, including, for example, polyester resins, butyral resins, acrylic resins, amino resins, epoxy resins, polyurethane resins, vinyl chloride resins, fluororesins, silicone resins, phenol resins and cellulosic resins. Polar group- or polar group salt moiety-containing resins belonging to such categories of resins as mentioned above are preferred among others. Specific examples of the polar group are hydroxyl, carboxyl, sulfonyl, acid amide and amino groups, and specific examples of the polar group salt moiety are soulfonic acid sodium salt and acid amide amine salt moieties. While these resins may be used singly, two or more species may also be used in admixture. For example, polyester acid amide amine salts are preferred for improving the dispersibility of carbon black and, on the other hand, butyral resins are preferred for maintaining the strength as a film; therefore, it is also possible to use mixtures of these two kinds of resins. It is also possible for the light shielding layer to contain, in addition to the composition mentioned above, carbon black particles smaller than 10 nm or larger than 50 nm, a leveling agent, an inorganic filler and/or the like each in an amount that will not lessen the effects of the invention. If necessary, use may be made of a diluent for the purpose of coating. On that occasion, the diluent can be used at an arbitrary addition level adapted for the intended thickness of the layer made of the curable resin composition.

Such diluent is not particularly restricted and may be any of those diluents commonly used in resin paints, including ketone compounds such as acetone, methyl ethyl ketone, methyl isobutyl ketone and cyclohexanone; ester compounds such as methyl acetate, ethyl acetate, butyl acetate, ethyl lactate and methoxyethyl acetate; ether compounds such as diethyl ether, ethylene glycol dimethyl ether, ethyl cellosolve, butyl cellosolve, phenyl cellosolve and dioxane; aromatic compounds such as toluene and xylene; aliphatic compounds such as pentane and hexane; halogenated hydrocarbons such as methylene chloride, chlorobenzene and chloroform; alcohol compounds such as methanol, ethanol, normalpropanol and isopropanol; and water, among others.

In particular, the above-mentioned color layer is preferably one made of a resin composition for transfer materials which comprises the above-mentioned components (a) to (c), namely:
Component (a): a pigment,
Component (b): a hydroxyl group-containing polymer,
Component (c): an acidic group- or basic group-containing polymer or a salt thereof,
wherein the mass proportion of the component (a) pigment is not lower than 60% by mass and not higher than 90% by mass with the sum of the components (a) to (c) being taken as 100% and wherein the component (a) pigment is carbon black not smaller than 10 nm and not larger than nm in particle diameter.

EXAMPLES

The following examples illustrate the present invention more specifically. These examples are, however, by no means limitative of the scope of the invention.

Examples 1 to 5 and Comparative Examples 1 to 5

A photocurable resin composition composed of 4% by mass of epoxy-modified BisA diacrylate (trade name: #540, product of Osaka Organic Chemical Industry Ltd.), 4% by mass of triazine triacrylate (trade name: M315, product of Toagosei Co., Ltd.), 2% by mass of epoxy-modified phenoxy acrylate (trade name: M600A, product of Kyoeisha Chemical Co., Ltd.), 2% by mass of γ-acryloyloxypropyltrimethoxysilane (trade name: KBM5103, product of Shin-Etsu Chemical Co., Ltd.), 8% by mass of poly(methylmethacrylate) (trade name: Parapet, product of KURARAY CO., LTD.), 1% by mass of a photopolymerization initiator (trade name: Irgacure 184, product of Nihon Ciba-Geigy K.K.) and 79% by mass of methyl ethyl ketone was applied onto a mold release agent-treated 50-μm-thick poly(ethylene terephthalate) film to a solid matter layer thickness of 20 μm, followed by 2 minutes of drying at 100° C. to give a transfer film (transfer film 1).

A color layer composition having the composition specified in Table 1 and Table 2 was prepared by kneading in a ball mill for 24 hours. The composition was then applied onto a 50-μm-thick poly(ethylene terephthalate) film to a solid matter layer thickness of 2 μm and dried at 100° C. for 2 minutes to give a transfer film (transfer film 2).

TABLE 1

|  |  | Ex. 1 | Ex. 2 | Ex. 3 | Compar. Ex. 1 | Compar. Ex. 2 |
|---|---|---|---|---|---|---|
| Composition | Carbon black A*1 (wt %) | 70 | 80 | 0 | 0 | 0 |
|  | Carbon black B*2 (wt %) | 0 | 0 | 70 | 0 | 0 |
|  | Carbon black C*3 (wt %) | 0 | 0 | 0 | 70 | 80 |
|  | Butyral resin*4 (wt %) | 15 | 10 | 15 | 15 | 10 |

TABLE 1-continued

|  |  | Ex. 1 | Ex. 2 | Ex. 3 | Compar. Ex. 1 | Compar. Ex. 2 |
|---|---|---|---|---|---|---|
|  | Polyester acid amide amine salt*5 (wt %) | 15 | 10 | 15 | 15 | 10 |
| Results | Carbon particle diameter (nm) | 20 | 20 | 40 | 110 | 110 |
|  | a* | 0.99 | 1.71 | 0.41 | 3.52 | 4.2 |
|  | b* | 0.03 | 0.65 | −0.38 | 1.50 | 2.3 |
|  | Area percentage (%) | 85.4 | 88.2 | 84.3 | 45.3 | 52.0 |
|  | Color reproducibility | ⊚ | ○ | ○ | X | X |

*1Trade name: Tokablack #8500F (product of Tokai Carbon Co., Ltd.)
*2Trade name: Tokablack #7100F (product of Tokai Carbon Co., Ltd.)
*3Trade name: Aqua-Black 162 (product of Tokai Carbon Co., Ltd.)
*4Trade name: MOWITAL 30B HH (product of KSE (KURARAY SPECIALTIES EUROPE)
*5Trade name: Disparlon DA-725 (product of Kusumoto Chemicals Ltd.)

TABLE 2

|  | Ex. 1 | Ex. 2 | Ex. 4 | Ex. 5 | Comp. Ex. 3 | Comp. Ex. 4 | Comp. Ex. 5 |
|---|---|---|---|---|---|---|---|
| Component (a)-1*1 | 70 | 80 | 70 | 70 | 30 | 95 | 70 |
| Component (b)-1*4 | 15 | 10 | 0 | 15 | 0 | 0 | 0 |
| Component (b)-2*6 | 0 | 0 | 15 | 0 | 0 | 0 | 0 |
| Component (c)-1*5 | 15 | 10 | 15 | 0 | 70 | 5 | 0 |
| Component (c)-2*7 | 0 | 0 | 0 | 15 | 0 | 0 | 0 |
| Acrylic polymer*8 | 0 | 0 | 0 | 0 | 0 | 0 | 30 |
| Pigment mass proportion (wt %) | 0.70 | 0.80 | 0.70 | 0.70 | 0.30 | 0.95 | 0.70 |
| Area percentage (%) | 85.4 | 88.2 | 80.3 | 75.0 | 25.0 | 95.5 | 70.3 |
| Color reproducibility | ⊚ | ○ | ○ | ○ | X | X | X |

*1Pigment (carbon black), trade name: Tokablack #8500F, product of Tokai Carbon Co., Ltd., particle diameter: 20 nm
*4Hydroxyl group-containing polymer (polybutyral), trade name: MOWITAL 30B HH, product of KSE
*6Hydroxyl group-containing polymer (acrylic polyol), trade name: Acrydic 57-773, product of Dainippon Ink and Chemicals, Incorporated
*5Polar group-containing polymer (acid amide amine salt-containing polyester), trade name: Disparlon DA-725 (product of Kusumoto Chemicals Ltd.)
*7Polar group-containing polymer (unsaturated polycarboxylic acid polyaminoamide), trade name: Disperk-130 (product of BYK-Chemie Japan)
*8Acrylic polymer (poly (methyl methacrylate)), trade name: Parapet (product of KURARAY CO., LTD.)

The transfer film 1 was applied to the flat surface of a lenticular lens provided with 150-μm-pitch cylindrical lenses on one side with the other side being flat (apparatus: model MRK-650Y laminator, product of MKC Co., Ltd.) and then the laminate was irradiated (using an THE 3000B exposure apparatus, product of HI-TECH Corp., irradiation intensity 10 mM/cm$^2$, dose 15 mJ/cm$^2$) from the lens face side to effect partial curing of the light-condensing parts alone.

Further, the base film of the transfer film 1 was peeled off, and the color layer side of the transfer film 2 was applied to the partly cured photocurable resin layer using a laminator.

The base film of the transfer film 2 was peeled off, and the resulting laminate was exposed to UV rays (irradiation intensity 100 mW/cm$^2$, dose 300 mJ/cm$^2$) from the light shielding layer side. A lenticular lens sheet with a light shielding pattern was thus produced.

Evaluation Methods
1. Carbon particle diameter: The film obtained was observed under a scanning electron microscope and the average primary particle diameter was measured for 30 carbon black particles selected at random.
2. a* and b*: The observing surface of the lenticular lens sheet with a light shielding pattern as obtained was measured for a* and b* according to JIS K 5600-4 (CIE 1976 (L*a*b*)) (apparatus name: SM Color Computer, product of Suga Test Instruments Co., Ltd.).
3. Color reproducibility: Each of the lenticular lens sheets with a light shielding pattern as obtained in Example 1 to 5 and Comparative Examples 1 to 5, in combination with a Fresnel lens of the same shape, was set on a projection television and subjected to color reproducibility comparison and evaluation by 10 observers selected at random. When all the 10 observers judged that the black color was deeper as compared with Comparative Example 1, the sheet was evaluated as O and, when the black color was judged deepest, as ⊚, and, in other cases, as x.

4. Area Percentage

The cross section of each lenticular lens sheet obtained with a light shielding pattern was observed under a scanning electron microscope (SEM). The area ratio between the particle portions and the other portions was measured and the packing rate was calculated with the case of the observed area wholly filled with particles being taken as 100% packing. For the area ratio measurement, the electron photomicrograph obtained by SEM observation was converted to a binary image and the area ratio was determined using the software "ImageJ" (United States National Institute of Mental Health/Neurological Disorders and Stroke, Research Support Branch HP http://rsb.info.nih.gov/ij/index.html).

The results obtained by the above evaluation methods are shown in Table 1 and Table 2. These results, in particular the results of Examples 1 to 3, indicate that when the average primary particle diameter of carbon black is not less than 10 nm and not more than 50 nm, lenticular lenses provided with a light shielding pattern and showing good color reproducibility can be obtained.

Further, the results of Examples 1, 2, 4 and 5 and Comparative Examples 3 to 5 indicate that when a color layer made of the resin composition for transfer materials according to the invention is provided, fine light shielding patterns high in blackness can be obtained.

Example 6

The procedure of Example 1 was followed in the same manner except that a lenticular lens sheet provided with ellipse-shaped lenses (30 μm in length, 13 μm in width, 150 μm in lengthwise pitch, 30 μm in transverse pitch). As a result of evaluation, the color reproducibility was judged as ⊚.

The invention claimed is:

1. A resin composition, comprising components (a)-(c):
Component (a): a pigment,
Component (b): a polymer comprising a hydroxyl group,
Component (c): a polymer comprising an acidic group or basic group or a salt thereof, wherein the mass proportion of the component (a) is not lower than 60% by mass and not higher than 90% by mass, wherein the mass proportion of the component (b) is not lower than 5% by mass and not higher than 20% by mass and wherein the mass proportion of the component (c) is not lower than 5% by mass and not higher than 20% by mass, with the sum of the components (a)-(c) being taken as 100%, wherein the component (a) pigment is carbon black having an average primary particle diameter of not smaller than 10 nm and not larger than 50 nm.

2. A transfer material comprising a transfer layer comprising the resin composition according to claim 1.

3. A transfer material comprising a transfer layer, wherein the transfer layer comprises the resin composition according to claim 1.

4. The transfer material comprising a transfer layer according to claim 2, wherein a color coordinate a* and a color coordinate b* as measured from an observing surface side according to JIS K 5600-4 satisfy the relations (1) and (2) given below:

$$-2.0 \leq a^* \leq 2.0 \tag{1}$$

$$-2.0 \leq b^* \leq 1.0 \tag{2}.$$

5. The transfer material comprising a transfer layer according to claim 3, wherein a color coordinate a* and a color coordinate b* as measured from an observing surface side according to JIS K 5600-4 satisfy the relations (1) and (2) given below:

$$-2.0 \leq a^* \leq 2.0 \tag{1}$$

$$-2.0 \leq b^* \leq 1.0 \tag{2}.$$

6. The resin composition according to claim 1, wherein the carbon black has a nitrogen adsorption-based specific surface area of from 50 $m^2/g$ to 500 $m^2/g$.

7. The resin composition according to claim 1, wherein the carbon black has a nitrogen adsorption-based specific surface area of from 200 $m^2/g$ to 400 $m^2/g$.

8. The resin composition according to claim 1, wherein the carbon black has a pH of from 2.5 to 8.0.

9. The resin composition according to claim 1, wherein component (b) is selected from the group consisting of a polyester resin, a poly(vinyl alcohol) resin, a butyral resin, an acrylic resin, an amino resin, an epoxy resin, a polyurethane resin, a vinyl chloride resin, a fluororesin, a silicone resin, a phenol resin and a cellulosic resin.

10. The resin composition according to claim 1, wherein component (b) is a a butyral resin.

11. The resin composition according to claim 1, wherein component (c) is an acrylic resin, a saturated polyester resin and/or an unsaturated polyester resin.

12. The resin composition according to claim 1, wherein the acidic group of component (c) is a carboxyl acid group or a sulfonic acid group, or a mixture thereof.

13. The resin composition according to claim 1, wherein the basic group of component (c) is an amino group, an imido group, an acid amide group, or a mixture thereof.

* * * * *